United States Patent [19]

Szlaga et al.

[11] Patent Number: 4,991,615

[45] Date of Patent: Feb. 12, 1991

[54] TANK PRESSURE CONTROL APPARATUS

[75] Inventors: Emil Szlaga; Robert S. Harris; Jeffery Griffin, all of Connersville, Ind.

[73] Assignee: Stant Inc., Connersville, Ind.

[21] Appl. No.: 488,289

[22] Filed: Mar. 2, 1990

[51] Int. Cl.⁵ .................. F16K 31/28; F16K 17/36
[52] U.S. Cl. .................................. 137/43; 137/202; 137/410; 137/587; 251/11
[58] Field of Search .............. 137/43, 202, 587, 410; 251/11; 220/85 VR, 85 VS

[56] References Cited

U.S. PATENT DOCUMENTS

| | | | |
|---|---|---|---|
| 1,219,928 | 3/1917 | Envart | 251/11 |
| 1,423,831 | 7/1922 | Cochrane | 137/38 |
| 1,579,543 | 4/1926 | King | 98/6 |
| 1,679,929 | 8/1928 | Brandon | 137/38 |
| 1,683,338 | 9/1928 | Evinrude | 137/43 |
| 2,159,178 | 5/1939 | Rike et al. | 220/326 |
| 2,208,352 | 7/1940 | Von Pichler Tennenberg | 251/11 X |
| 2,396,233 | 3/1946 | Abrams | 137/43 X |
| 2,528,600 | 11/1950 | Lombard | 137/43 |
| 3,521,652 | 7/1970 | Reeks | 137/38 |
| 3,603,339 | 9/1971 | Swain | 137/410 X |
| 3,612,089 | 10/1971 | Beguiristain | 137/202 X |
| 3,738,384 | 6/1973 | Hall | 137/493.9 |
| 3,910,302 | 10/1975 | Sudhir | 137/202 X |
| 3,970,098 | 7/1976 | Boswank et al. | 137/43 X |
| 3,996,951 | 12/1976 | Parr et al. | 137/43 |
| 4,007,643 | 2/1977 | Matsushita | 137/38 X |
| 4,416,108 | 11/1983 | Ghandhi | 220/85 VS X |
| 4,655,238 | 4/1987 | Szlaga | 137/43 |
| 4,694,847 | 9/1987 | Szlaga | 137/43 X |
| 4,735,226 | 4/1988 | Szlaga | 137/43 |
| 4,753,262 | 6/1988 | Bergsma | 137/43 X |
| 4,760,858 | 8/1985 | Szlaga | 137/43 |

*Primary Examiner*—John Rivell
*Attorney, Agent, or Firm*—Barnes & Thornburg

[57] ABSTRACT

An apparatus is provided for controlling flow of liquid through an aperture. The apparatus includes a housing and a float valve disposed in and unattached to the housing. The float valve is formed to include a float chamber and is movable in the housing between an aperture-blocking position and an aperture-unblocking position. The apparatus further includes a mechanism for controlling movement of the float valve by selectively venting fluid from the float chamber to reduce the buoyancy of the float valve.

62 Claims, 6 Drawing Sheets

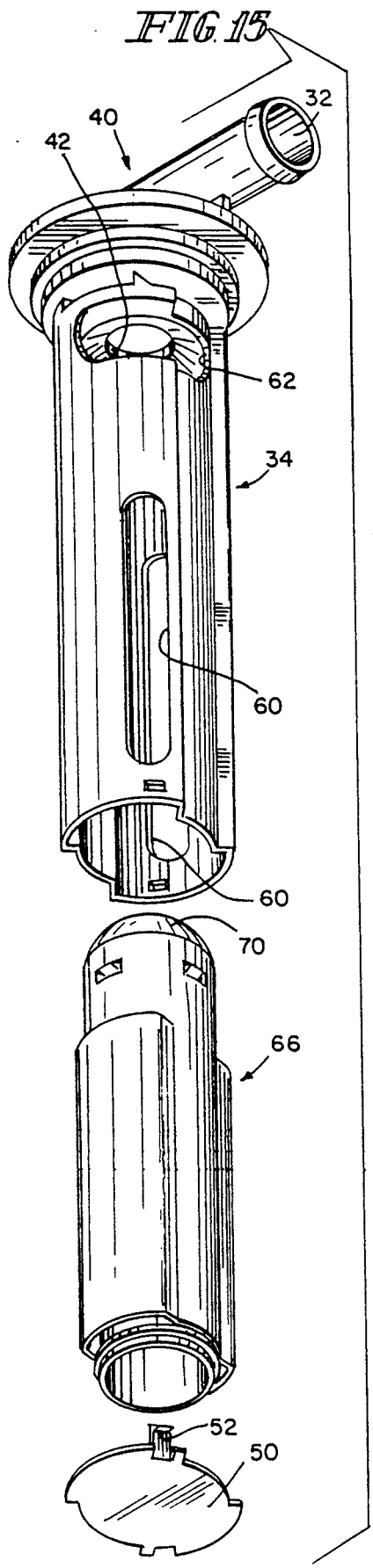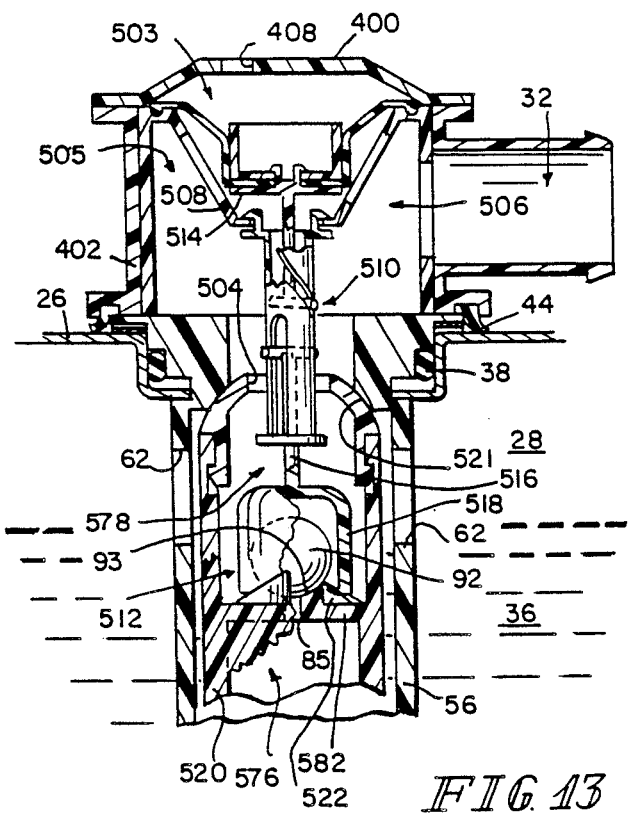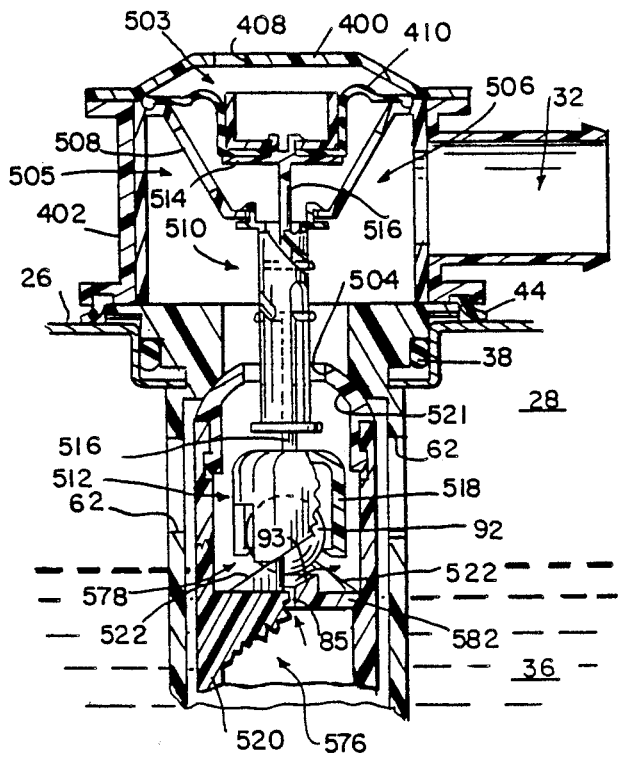

TANK PRESSURE CONTROL APPARATUS

BACKGROUND AND SUMMARY OF THE INVENTION

The present invention relates to tank pressure control apparatus, and particularly to valve apparatus which operates to seal the vapor space in the interior of a fuel tank during refueling and reopens at some point after refueling has been completed to vent the vapor space. More particularly, the present invention relates to a tank pressure control apparatus having a float valve movable to close a venting outlet in a fuel tank during refueling and a device for assisting in moving the float valve to a venting outlet-opening position after refueling has been completed.

Vehicle fuel systems are known to include pressure-relief valves mountable on either fuel tanks or filler necks. These conventional valves are not equipped to regulate the volume of fuel introduced into the vehicle fuel system during refueling. Although fuel pump nozzles are known to include sensor means for shutting off the flow of fuel from the nozzle when the fuel tank is nearly filled, it has been observed that users frequently manually override or bypass such fill-limiting sensors by continuing to pump fuel after the pump nozzle has automatically shut off several times. It will be appreciated that such unauthorized refueling practices can result in overfilling the fuel tank which can effectively reduce the fuel vapor expansion capacity available within the filled fuel tank.

An improved tank pressure control system is provided for maintaining a head pressure within the fuel tank which exceeds the maximum head pressure that can develop in the filler neck due to filling the filler neck with fuel. The improved control system advantageously aids in preventing fuel pump operators from overfilling fuel tanks by providing a pressurized fuel vapor barrier within the fuel tank that acts to block the introduction of fuel into the fuel tank in excess of a predetermined fuel capacity during refueling.

At the same time, the improved system is adapted to release fuel vapor in periods other than during refueling to increase the flow of fuel vapor to, for example, the atmosphere under the control of a pressure-relief fuel cap or the like. Such a timely release of fuel vapor from the fuel tank minimizes the risk that an excessive pressure buildup will occur in the tank during vehicle operation and drive a surge of liquid fuel through the filler neck to impinge the fuel cap and thereby avoid shortcomings of known fuel tank pressure control systems.

One object of the present invention is to provide a tank pressure control apparatus that closes a tank venting outlet during refueling to control the amount of fuel that can be introduced into the fuel tank and reopens after refueling has been completed to permit generally unrestricted venting of the fuel tank under the control of a pressure-vacuum relief valve mounted on the filler neck fuel cap or elsewhere.

Another object of the present invention is to provide a tank pressure control apparatus that includes a float valve supported for movement in the fuel tank to close a tank-venting outlet during refueling and a device for assisting in positively moving the float valve away from its tank vent-closing position after refueling has been completed in response to exposure of the device to either an external force generated during operation or movement of the vehicle after refueling or a pressure differential developed around the device after refueling whether the vehicle is being operated or not.

Yet another object of the present invention is to provide a tank pressure control valve assembly that is configured to close a tank venting outlet in the event that an attempt is made to put more fuel into a full or nearly full fuel tank to ensure that a user cannot inadvertently or deliberately overfill the fuel tank.

According to the present invention, an apparatus is provided for controlling discharge of fuel vapor from a fuel tank having a filler neck during refueling. The apparatus includes a valve housing mounted in a wall of the fuel tank and formed to include a venting outlet coupled by hose means to the filler neck. The apparatus includes closing means provided in the valve housing for closing the venting outlet in response to filling the fuel tank to a predetermined level. The closing means includes a float valve formed to include an outlet closing portion and an interior chamber configured to retain air or fuel vapor therein so that the float valve is buoyantly supported in liquid fuel which is admitted into the valve housing during refueling. The float valve is also formed to include an aperture providing an opening into the interior chamber.

The apparatus further includes a device for controlling discharge of air or fuel vapor from the interior chamber in the float valve through the aperture. The device is normally positioned to close the aperture in the float valve so that air and fuel vapor is retained in the interior chamber thereof to provide the float valve with sufficient buoyancy to float in liquid fuel admitted into the valve housing. Thus, the float valve is able to float in liquid fuel to its outlet-closing position during refueling. The device is movable to a position uncovering the aperture to release pressurized air or fuel vapor contained in the interior chamber causing the float valve to become less buoyant and sink to a venting outlet-opening position. Such movement only occurs after refueling has been completed. In certain embodiments, the device is moved in response to external forces generated during operation or movement of the vehicle carrying the fuel tank. In other embodiments, the device is moved upon exposure to a pressure differential developed around the device whether the vehicle is stationary or in motion.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 13 is a view of another embodiment of the present invention;

FIG. 14 is a view similar to FIG. 13 showing the ball valve lifted off of the valve seat formed in the float valve; and FIG. 15 is a perspective view of a preferred embodiment of the invention.

DETAILED DESCRIPTION OF THE DRAWINGS

Fuel-dispensing nozzles of the type used to fill vehicle fuel tanks typically include means for triggering shut off of fuel flow from the nozzle upon exposure of the tip of the nozzle to liquid fuel in the filler neck. Thus, to prevent overfilling of the fuel tank, it is necessary for liquid fuel to move up in the filler neck toward the fuel-dispensing nozzle during refueling as soon as the tank is nearly full so that enough liquid fuel will be present in the filler neck to splash onto the tip of the nozzle at just the right time and actuate the triggering means in the nozzle to stop further delivery of fuel from the nozzle into the tank.

Figure 1:
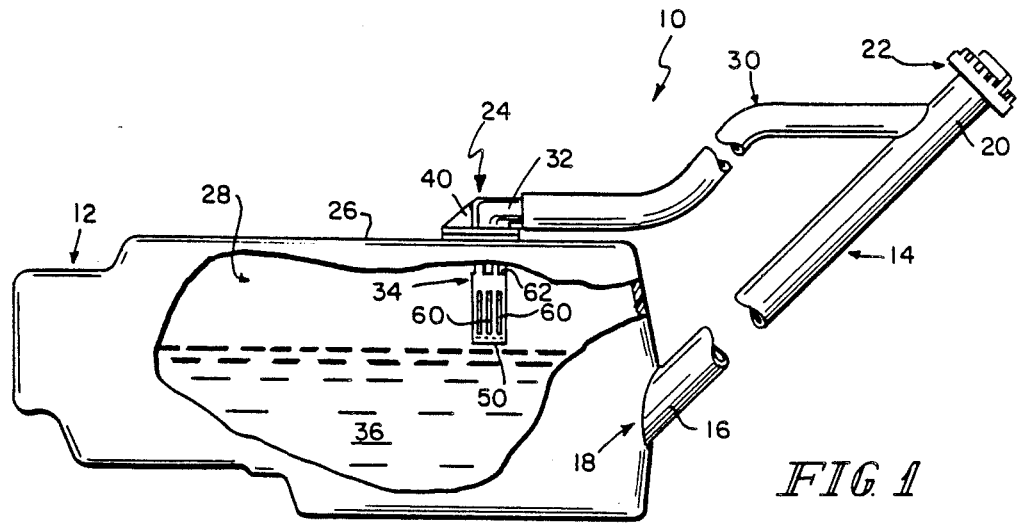
FIG. 1 is a diagrammatic view of a fuel system incorporating an embodiment of the present invention therein.

A preferred embodiment of a tank pressure control system 10 in accordance with the present invention is illustrated in FIG. 1. Control system 10 includes a fuel tank 12 and a filler neck 14 having a proximal portion 16 connected to the fuel tank 12 at a junction 18 and a distal portion 20 defining a mouth supporting a fuel cap 22. Specifically, control system 10 includes a fuel vapor control valve assembly 24 mounted in a top wall 26 of fuel tank 12 to extend downward into the interior of the fuel tank 12. The valve assembly 24 is configured to conduct fuel vapor and the like between a vapor space 28 which develops in the upper interior region of fuel tank 12 above any liquid fuel 36 therein to a vapor hose 30 provided outside of fuel tank 12. Vapor hose 30 interconnects a vapor discharge channel 32 of valve assembly 24 and distal portion 20 of filler neck 13 in the vicinity of the filler neck mouth to conduct fluid such as air or pressurized fuel vapor or both between the valve assembly 24 and the filler neck 20.

Figure 2:
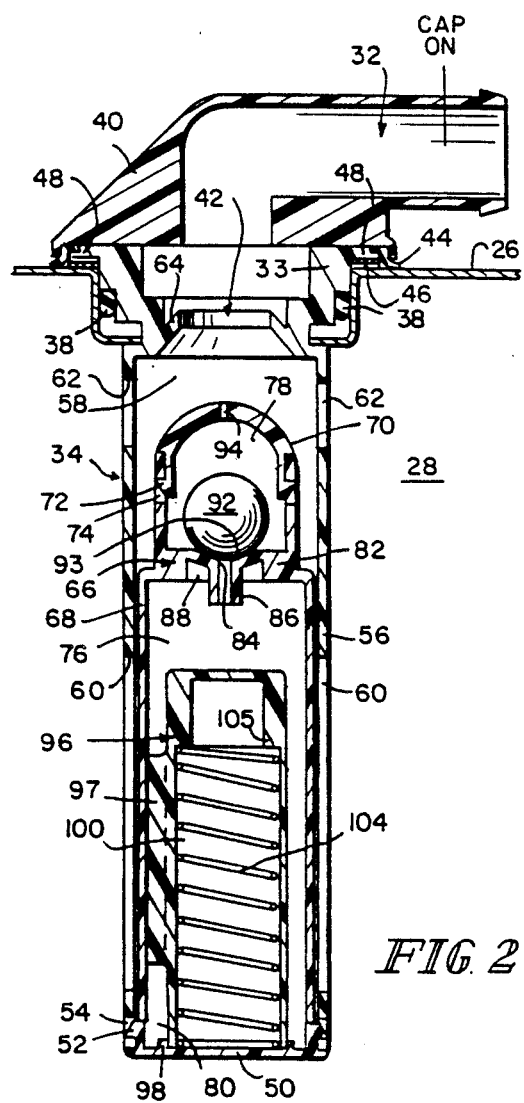
FIG. 2 is a transverse sectional detail view of one embodiment of an apparatus in accordance with the present invention showing a float valve in a vent-opening position at a low tank fuel level and an external force-actuated ball valve covering a venting aperture formed in the float valve.
Figure 3:
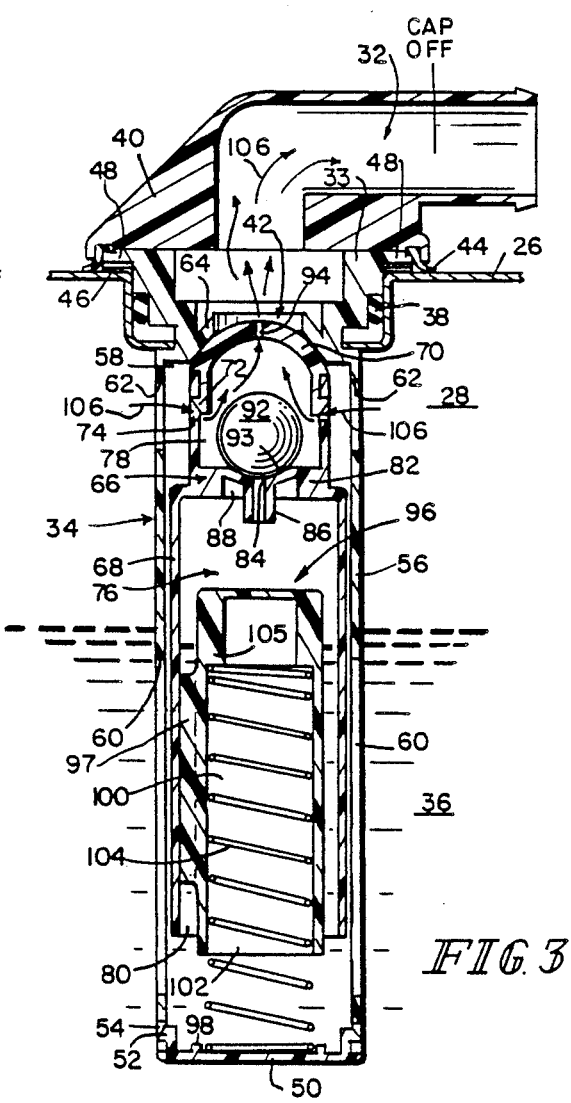
FIG. 3 is a view of the embodiment of FIG. 2 while the fuel cap is off the filler neck during refueling showing the float valve in its outlet-closing position at a high tank fuel level and the ball valve in a seated position on the float valve.

Valve assembly 24 also includes a valve housing 34 projecting downwardly from the top wall 26 a sufficient distance so that it is able to communicate with liquid fuel in the tank 12 once the tank 12 is nearly full as shown for example in FIG. 3. A sealing gasket 38 is installed between an upper mounting fixture 33 of valve housing 34 and top wall 26 of the fuel tank 12 to establish a vapor seal between the valve housing 34 and top wall 26 as shown in FIG. 2. The upper mounting fixture 33 is formed to include a central venting outlet 42 as shown in FIG. 2 to vent fuel vapor from the vapor space 28 in fuel tank 12.

Valve assembly 24 also includes a vent housing 40 provided outside of fuel tank 12 and mounted on valve housing 34 so as to communicate with the venting outlet 42 formed in the top end of valve housing 34. Another annular sealing gasket 44 is installed between the vent housing 40 and the top wall 26 of the fuel tank 12 to establish a fuel vapor seal therebetween. Vent housing 40 is preferably molded of plastic to provide vapor discharge channel 32. A wavey washer 46 or the like is provided in the annular space between the top wall 26 of fuel tank 12 and an annular outer lip 48 of upper mounting fixture 33 to bias the valve housing 34 into tight engagement with the vent housing 40.

As shown in FIG. 2, valve housing 34 terminates in a bottom closure member 50 which has flanges 52 formed to snap-fit into recesses 54 formed in valve housing 34. A valve chamber 58 is defined in valve housing 34 between the axially extending elongated side wall 56 of valve housing 34 and the bottom closure member 50. A preferred shape of valve housing 34 is shown in FIG. 15.

Side wall 56 of valve housing 34 is formed to include a plurality of axially extending inlet openings of "church windows" 60 positioned near the axially downward end of valve housing 34 to allow liquid fuel to pass from the fuel tank 12 into valve chamber 58. Side wall 56 is also formed to include a plurality of vapor inlet openings 62 allowing fuel vapor from vapor space 28 of fuel tank 12 to enter into valve chamber 58. This fuel vapor can then exit valve chamber 58 through venting outlet 42 and pass into vapor discharge channel 32 when the float valve 66 is in an outlet-opening configuration as illustrated in FIG. 2. Vapor inlet openings 62 are preferably located as far above the liquid fuel level as practicable to minimize carryover of liquid fuel droplets in the venting fuel vapor. Valve housing 34 also includes an upwardly projecting, downwardly facing frustoconical valve seat 64 provided in the upper mounting fixture 33 and formed to include a central aperture defining the venting outlet 42 in the valve housing 34. This valve seat 64 is positioned to lie axially above the plurality of vapor inlet openings 62 provided about the circumference of side wall 56 as shown in FIG. 2.

A float valve 66 is positioned in valve chamber 58 and is free to float on liquid fuel received in valve chamber 58 through inlet openings 60 and move in axial directions toward and away from valve seat 64. A preferred shape of float valve 66 is shown in FIG. 15. Float valve 66 includes an elongated body portion 68 and a dome-shaped upper cap 70. Upper cap 70 is provided with flanges 72 to snap fit into circumferentially extending openings 74 formed in body portion 68. Upper cap 70 is shaped and configured to seat and seal against the frustoconical valve seat 64 and block flow of fuel vapor through the venting outlet 42 from vapor space 28 into the vent housing 40 in response to sufficient upward movement of float valve 66 in the valve chamber 58 during rising fuel levels in tank 12 created by refueling. Body portion 68 is sized to rest on flange means 98 provided on the inside wall of closure member 50 when the float valve 66 is in a static condition as illustrated in FIG. 2.

Float valve 66 includes a partition wall 82 provided at its upper end and configured to divide the interior of the float valve 66 into a lower chamber 76 and an upper chamber 78 as seen in FIG. 2. The dome-shaped upper cap 70 actually cooperates with an upstanding side wall 79 provided above partition wall 82 to define upper chamber 78. The volume of lower chamber 76 is relatively larger than upper chamber 78 and is sized to hold enough air or fuel vapor to permit float valve 66 to float in liquid fuel admitted into valve chamber 58. Float valve 66 is formed to include an axially downwardly facing bottom opening 80 directly communicating with liquid fuel introduced into valve chamber 58.

Partition wall 82 is formed to include a conical ball-receiving valve seat 93 on its upper surface. Valve seat 93 is formed to include a central aperture 84 therethrough. A "snorkel tube" 86 depends from the underside of valve seat 93 as shown best in FIG. 2. The snorkel tube 86 is formed to include an internal passageway communicating with the central aperture formed in the valve seat 93 to provide venting passageway means 84 for conducting fuel vapor between the lower and upper chambers 76, 78 in the float valve 66.

The partition wall 82 is also formed to include a small, annular, downwardly opening cavity or vapor reservoir 88 around snorkel tube 86 and underneath the conical valve seat 93 as shown in FIG. 2. Fuel vapor trapped in vapor reservoir 88 must follow a flow path marked by arrow 90 (see FIG. 4a) around snorkel tube 86 in order to reach the mouth of venting passageway 84 and escape from lower chamber 76. Advantageously, then, air or fuel vapor will remain trapped in vapor reservoir 88 even when a relatively large amount of liquid fuel has entered lower chamber 76 and displaced a significant volume of fuel vapor out of lower chamber 76 through venting passageway 84, as in the overfill condition illustrated in FIG. 5. Retention of a volume of air or fuel vapor in vapor reservoir 88 provides added buoyancy to float valve 66 to enable it to move more quickly from an outlet-opening position to the outlet-closing position as illustrated in FIG. 5.

A ball valve 92 is disposed in upper chamber 78 and is sized to seat on the conical valve seat 93 formed in partition wall 82. Ball valve 92 is free to move in upper chamber 78 between a seated position and various venting positions whenever the vehicle carrying fuel tank 12 is in motion. Ball valve 92 is normally gravitationally urged into a seated position against valve seat 93 to close venting passageway 84, thereby blocking flow of fuel vapor therethrough. Thus, any air or fuel vapor present in the lower chamber 76 is retained therein to provide buoyancy to the float valve 66.

Ball valve 92 is selected to have a mass and size such that in response to normal vehicle movement, ball valve 92 will rock or otherwise move on or relative to valve seat 93 to a venting position in which fuel vapor may vent through orifice 84 between lower chamber 76 and upper chamber 78. This movement or "rattle" of the ball valve 92 permits generally unrestricted venting of the lower chamber when the vehicle is in motion. However, such venting is blocked whenever the vehicle is stationary such as during refueling.

Fuel vapor is communicated between the valve chamber 58 in valve housing 34 and the upper chamber 78 in float valve 66 by way of an opening provided at the location where upper cap 70 snaps onto body portion 68. Fuel vapor which has escaped from lower chamber 76 into upper chamber 78 through venting passageway 84 is vented from upper chamber 78 into vapor space 28 through opening 74 into valve chamber 58. When float valve 66 moves to an outlet-opening position, the escaped fuel vapor can vent from the valve chamber 58 into vapor discharge channel 32 through venting outlet 42, and fuel vapor from vapor space 28 can vent through vapor inlet opening 62 to venting outlet 42 and vapor discharge channel 32.

The upper cap 70 is formed to include bleed aperture 94 for gradually venting a very limited amount of fuel vapor through the upper chamber 78 from vapor space 28 to the vapor discharge channel 32 in the vent housing 40 to accommodate vapor expansion due to temperature effects. When float valve 66 is in its outlet-closing position, fuel vapor from vapor space 28 may circulate through vapor inlet opening 62 and may actually enter upper chamber 78 through opening 74.

One feature of the present invention is the provision of bleed aperture 94 in the float valve 66 to bleed fuel vapor gradually from the fuel tank 12 to the vapor discharge channel 32. Although such bleeding is not significant enough to move the float valve to its outlet-opening position during refueling, it is significant enough, over time, to release built-up pressure from the vapor space of the fuel tank.

Advantageously, fuel vapor is free to escape from the fuel tank 12 through bleed aperture 94 even though float valve 66 is in its outlet-closing position. Thus, a slow expansion of fuel vapor in fuel tank will not result in unwanted vapor pressure build-up in the fuel tank.

An auxiliary float 96 is positioned in lower chamber 76 of float valve 66 and is rigidly connected to float valve 66 to move therewith in the valve chamber 58. A volume of air is always trapped within the hollow auxiliary float 96 to enhance the buoyancy of float valve 66 to refloat float valve 66 quickly when necessary. As shown in FIG. 2, one or more elongated webs 97 connect auxiliary float 96 to an inside wall of float valve 66. For example, float valve 66 can be molded as one part and an auxiliary float 96 with attached webs 97 can be molded as a second part. The auxiliary float 96 can be retained in place in the lower chamber 76 by means of, for example, an interference fit between webs 97 and float valve 66 or an ultrasonic weld. Webs 97 provide stand-offs so that liquid fuel and fuel vapor is able to flow in spaces between float valve 66 and auxiliary float 96.

When the float valve 66 is in its static condition as shown in FIG. 2, auxiliary float 96 rests in a position inside upstanding rim 98 formed on closure member 50. Auxiliary float 96 is formed to include an interior chamber 100 for retention of air or fuel vapor therein and is also formed to include a bottom opening 102 allowing direct communication with liquid fuel. In use, auxiliary float 96 is like an inverted cup in that it traps and retains a volume of air inside even though it is moved open mouth first downwardly into a pool of liquid because there is no outlet for exhausting air trapped inside the cup. A compression spring 104 trapped within interior chamber 100 of auxiliary float 96 acts between the upper surface of closure member 50 and a radially inwardly extending lip 105 provided at the upper end of auxiliary float 96 to assist in lifting the subassembly of float valve 66 and auxiliary float 96 within the valve chamber 58 as the fuel level therein rises during refueling.

In operation, it will be seen that float valve 66 operates to control flow of fuel vapor through venting outlet 42 between the interior of fuel tank 12 and the vapor discharge channel 32. Float valve 66 can float in an upward direction in valve housing 34 as the fuel level in tank 12 rises during refueling to engage valve seat 64 and block any further discharge of fuel vapor from the tank 12 through venting outlet 42. At this stage the filler neck 14 no longer serves as a fuel vapor venting outlet of the fuel tank since junction 18 is submerged in liquid fuel and thus outlet 42 is the only venting outlet of the tank 12. By closing the only venting outlet of the tank 12, a pressure head will develop in vapor space 28 as a result of continued tank filling and, in effect, block further introduction of fuel into tank 12 once a predetermined volume of fuel in the tank 12 is reached.

Ball valve 92 is an external force-actuated device provided on float valve 66 which operates in the manner described below to help loosen or dislodge the float valve 66 from its venting outlet-closing position shown in FIG. 3 after refueling is completed. If the float valve 66 inadvertently sticks in its outlet-closing position, then the external force-actuated ball valve 92 can move away from its seated position covering the venting passageway 84 whenever the vehicle is in motion to, in effect, help sink the float valve 66 in the manner described below and reopen the venting outlet 42 to permit generally unrestricted venting of the fuel tank 12 to the distal end 20 of the filler neck 14 through vapor hose 30. Typically, an air pressure relief and vacuum relief valve (not shown) is provided in fuel cap 22 to control venting of filler neck 14 (and now tank 12) to the atmosphere.

During refueling, fuel is added to fuel tank 12 using a fuel-dispensing nozzle (not shown) until the fuel eventually reaches the level of inlet openings 60 formed in valve housing 34 at which point the liquid fuel enters valve chamber 58 as shown in FIG. 3. As the liquid fuel level in the tank 12 rises further, the liquid fuel level in the valve chamber 58 also rises. Float valve 66, having a volume of trapped fuel vapor in lower chamber 76 (as well as additional volumes of air trapped in reservoir 88 and in chamber 100 of auxiliary float 96), begins to float assisted by compression spring 104 in the liquid fuel in the valve chamber 58. Liquid fuel begins to enter lower chamber 76 as shown in FIG. 3 without entering the chamber 100 formed in auxiliary float 96 as shown in FIG. 3 because auxiliary float 96 is a closed inverted cup-like container as described above.

Auxiliary float 96 provides added buoyancy to float valve 66 by its displacement of liquid fuel from the lower chamber 76 formed in float valve 66. At a predetermined liquid fuel level, float valve 66 will float to the outlet-closing position illustrated in FIG. 3 in which upper cap 70 is seated against the conical valve seat 64 to substantially block outward flow of pressurized fuel vapor from the interior of fuel tank 12 through venting outlet 42.

Fuel vapor can escape through venting outlet 42 only by way of bleed aperture 94 at a slow rate governed by the size of bleed aperture 94 flow path represented by arrows 106. Thus, fuel vapor is retained in vapor space 28 to provide a pressurized "vapor barrier" inside fuel tank 12 limiting the amount of liquid fuel that can be introduced to the tank 12. In effect, the float valve 66 controls discharge of fuel vapor to develop and maintain a head pressure within the fuel tank 12 which exceeds the maximum head pressure that can develop in the filler neck due to filling the filler neck 14 with fuel. Thus, the float valve 66 operates to prevent fuel pump operators from inadvertently or intentionally overfilling fuel tank 12.

Figure 4A:
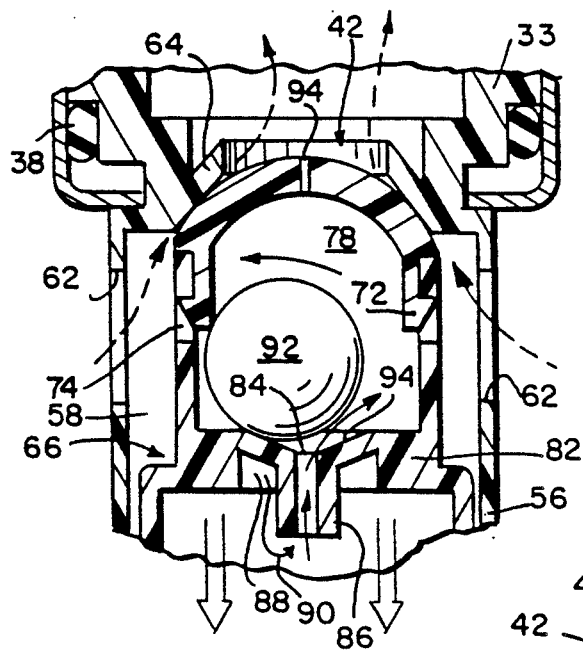
FIG. 4a is an enlarged sectional view of a portion of the embodiment of FIG. 2 showing the ball valve after it has moved to a venting position uncovering the venting aperture formed in the float valve in response to external forces generated during normal vehicle operation or movement to allow pressurized fuel vapor to escape from a chamber in the float valve through the venting aperture to the vapor space in the fuel tank, thereby reducing the buoyancy of the float valve.
Figure 4B:
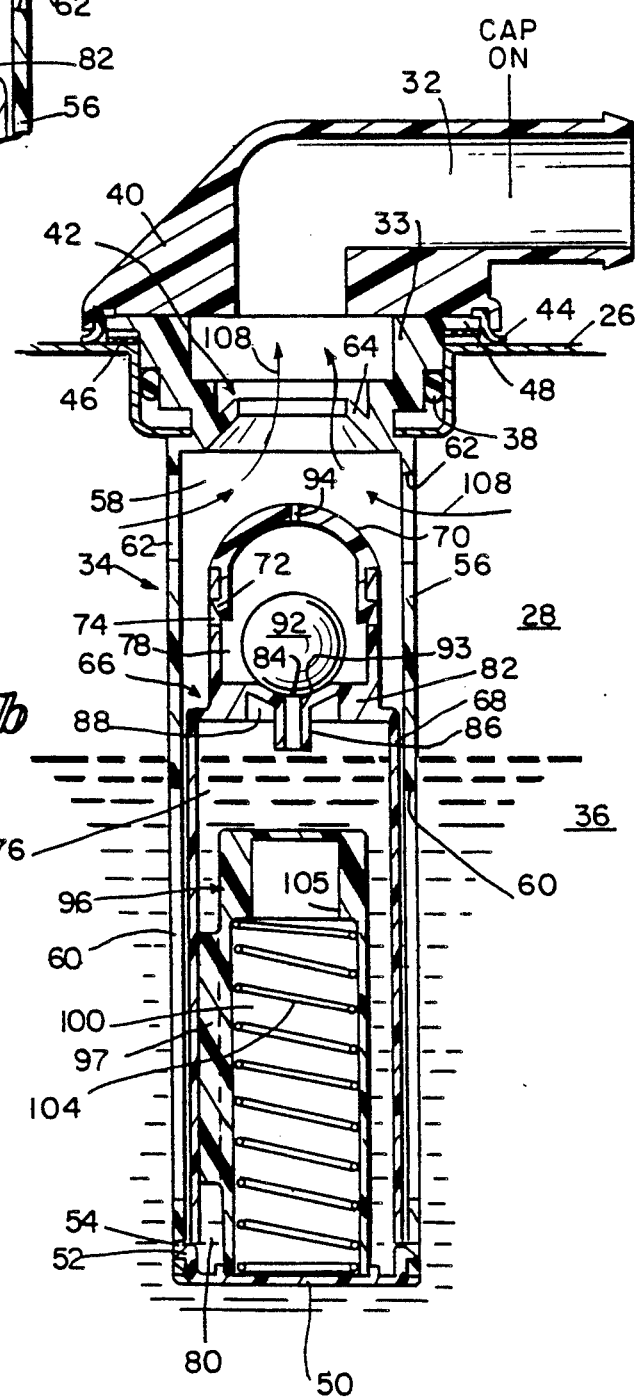
FIG. 4b is a view of the embodiment of FIG. 2 showing the relatively lower position of the float valve in a full or nearly full fuel tank to an outlet-opening position after the float valve has lost buoyancy because of movement of the ball valve to vent the chamber in the float valve and after replacement of the the fuel cap on the filler neck.
Figure 5:
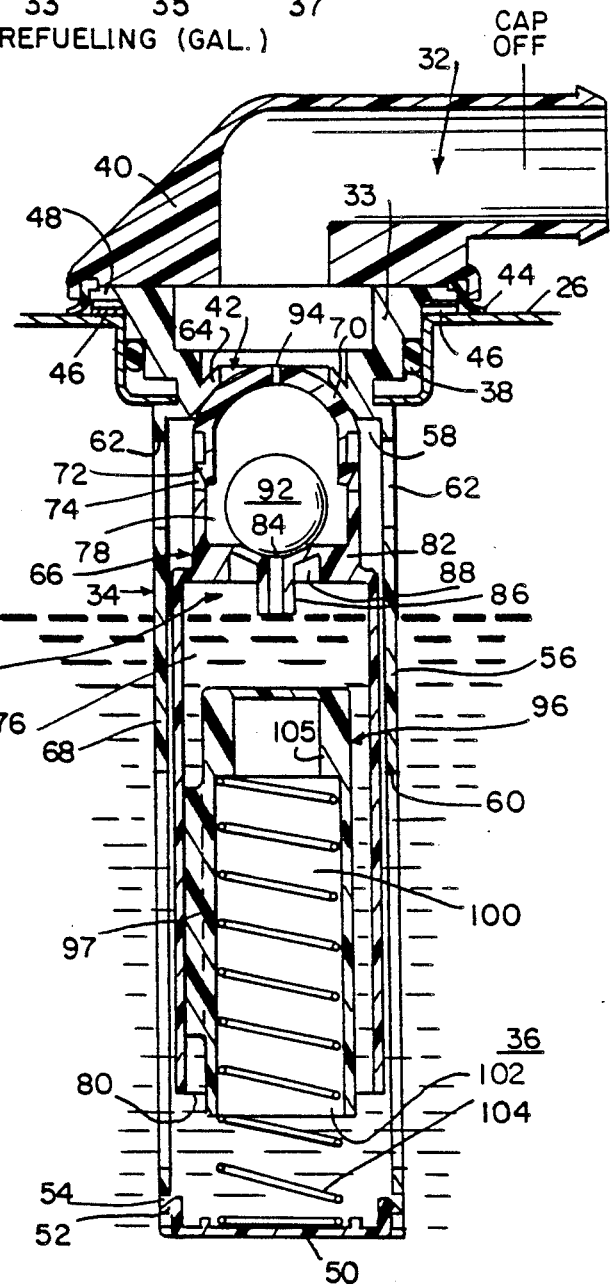
FIG. 5 is a view of the embodiment of FIG. 2 illustrating the ability of the float valve to move to its outlet-closing position in the event a fuel pump operator attempts to add more fuel to a full or nearly full fuel tank because in part a first trapped air volume in the float vale and/or a second trapped air volume in an auxiliary float inside the float valve assists the float valve in floating to its outlet-closing position.

The sequence of events leading to sinking of the float valve 66 from its outlet-closing position to its outlet-opening position is illustrated in FIGS. 4a and 4b. At this stage, refueling has been completed, the fuel cap 22 is in place on the filler neck 14, and the vehicle is being operated. Advantageously, in response to normal movement of the vehicle, external force-actuated ball valve 92 rocks or otherwise moves on or relative to valve seat 93 to a venting position as shown in FIG. 4a temporarily to allow fuel vapor in lower chamber 76 to discharge into upper chamber 78 by way of the venting passageway extending through snorkel tube 86. The pressure of fuel vapor in lower chamber 76 exceeds the ambient fuel vapor pressure in vapor space 28 so that fuel vapor will exit from lower chamber 76 in float valve 66 upon movement of ball valve 92 to a venting position.

As fuel vapor escapes from lower chamber 76, float valve 66 loses buoyancy and moves to an outlet-opening position illustrated, for example, in FIG. 4b, thereby allowing fuel vapor in vapor space 28 to escape through vapor inlet opening 62 and through venting outlet 42 along the flow path represented by arrows 108. Advantageously, the float valve 66 will lose enough buoyancy as a result of the venting of fuel vapor through venting passageway 84 from the lower chamber 76 that the dome-shaped upper cap 70 will disengage from the downwardly facing conical valve seat 64 even if pressure, temperature, or other conditions extant in fuel tank 12 would otherwise cause float valve 66 to stick in its outlet-closing position against valve seat 64. Thereafter, generally unrestricted venting of fuel tank 12 can take place via venting outlet 42.

After allowing fuel vapor to escape from chamber 76, ball valve 92 once again seats on valve seat 93 to cover the central aperture communicating with venting passageway 84 as the now "less buoyant" float valve 66 sinks to a lower position within the valve chamber 58 formed in valve housing 34. Advantageously, ball valve 92 is of a weight such that it will exert a downward force on float valve 66 sufficient to assist in sinking float valve 66. Once the foregoing sequence of events has occurred, the float valve 66 is in a position ready to float upwardly to close the venting outlet 42 if more fuel is added to the fuel tank 12 either immediately or at a later time after some of the fuel in the tank 12 has been consumed in the vehicle's engine (not shown).

In FIG. 5, the valve assembly 24 is shown in a condition in which the fuel tank 12 is initially relatively full and the fuel pump operator has attempted to introduce additional fuel. Sometimes fuel pump operators try to overfill a fuel tank inadvertently, and other times they try to overfill the tank deliberately in a good-faith effort to fill the tank "completely." Since the fuel tank 12 is substantially full to begin with, float valve 66 is initially substantially submerged in liquid fuel and movement of float valve 66 to its outlet-closing position might not be assured. However, the volume of air or fuel vapor retained in chamber 100 of auxiliary float 96 provides buoyancy to help refloat float valve 66. In addition, despite the high liquid fuel level, air or fuel vapor is retained in vapor reservoir 88 and can also provide added buoyancy. Still further, it will be appreciated that a third volume of air or fuel vapor is always trapped near the top of lower chamber 76 because of the length of snorkel tube 86. Referring to FIG. 5, it is evident that once the level of liquid fuel inside the lower chamber 76 is high enough to cover the open mouth of snorkle tube 86 all of the air or fuel vapor in annular space 89 below vapor reservoir 88 and above the crest of the liquid fuel and around the snorkel tube 86 provide added buoyancy to float valve 66. Thus, even when an additional amount of fuel is added to a relatively full tank, float valve 66 will refloat to the outlet-blocking position to provide a vapor barrier to limit fill as has been previously described. Of course, compression spring 104 assists in lifting float valve 66 and causes float valve 66 to operate as a roll-over valve to close off venting outlet 42 during vehicle rollover or the like.

Figure 6:
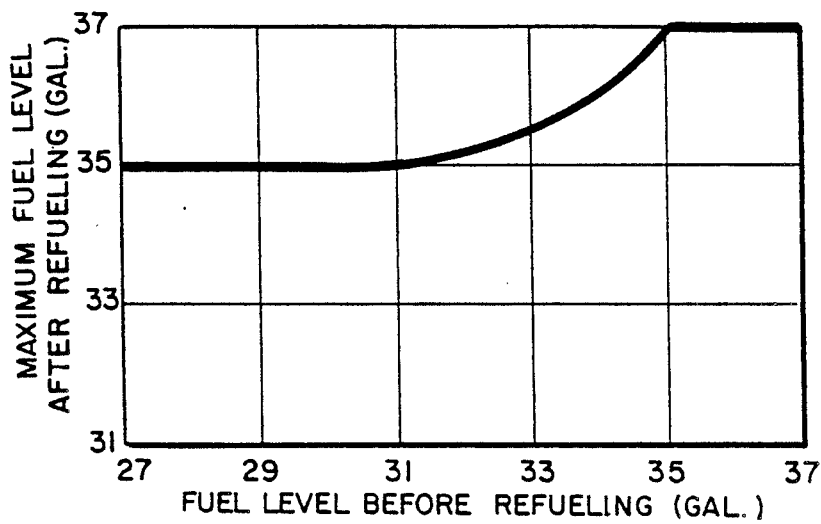
FIG. 6 is a graph illustrating a plot of the maximum fuel level in the fuel tank after fill versus fuel level in the fuel tank at the start of the fill demonstrating the variance in the maximum amount of fuel that can be put into a fuel tank provided with a float valve made in accordance with a preferred embodiment of the present invention.

As shown in FIG. 6, an apparatus in accordance with the present invention can be provided to limit the amount of additional fuel which can be added to a relatively full tank. In FIG. 6, the fuel level after refueling is plotted on the vertical axis over a given range of fuel levels before refueling is plotted on the horizontal axis.

The graph shows that for fuel levels before refueling of less than or equal to about 31 gallons, the corresponding maximum fuel level after refueling will be about 35 gallons. That is, at a predetermined level corresponding to 35 gallons, the float valve 66 will have floated to the outlet-closing position, providing a vapor barrier to prevent additional fuel from being introduced into the tank 12.

The graph also shows that for fuel levels before refueling of greater than or equal to about 35 gallons, the corresponding maximum fuel level after refueling will be about 37 gallons. It is thought that this result is achieved largely through the provision of "permanent buoyancy chambers" such as one or more of vapor reservoir 88, chamber 100 in auxiliary float 96, and annular space 84 around snorkel tube 86. As shown by the plot, when the initial fuel level is relatively high (e.g. higher than about 31 gallons), float valve 66 is sufficiently submerged in liquid fuel that it might not refloat to its outlet-closing position at the 35 gallon level, but rather will allow an additional amount of fuel to be added to the tank 12 before closing venting outlet 42. This raises the possibility that at very high initial fuel levels, sufficient additional fuel will be added such that little or no vapor barrier will be provided in the tank. In other words, the tank 12 will fill with liquid before float valve 66 ever floats to the outlet-closing position. By providing properly calibrated permanent buoyancy chambers by properly sizing one or more of the vapor reservoirs 88, the auxiliary float 96, or the snorkel tube 86, the buoyancy of float valve 66 can be enhanced as previously described such that at very high initial fuel levels (e.g., 35 gallons or higher), float valve 66 will, in effect, allow only two additional gallons of liquid fuel to be introduced into the tank 12 before moving to the outlet-closing position and causing the triggering means on the fuel-dispensing nozzle (not shown) to shut off delivery of fuel to the fuel tank 12.

Figure 7:
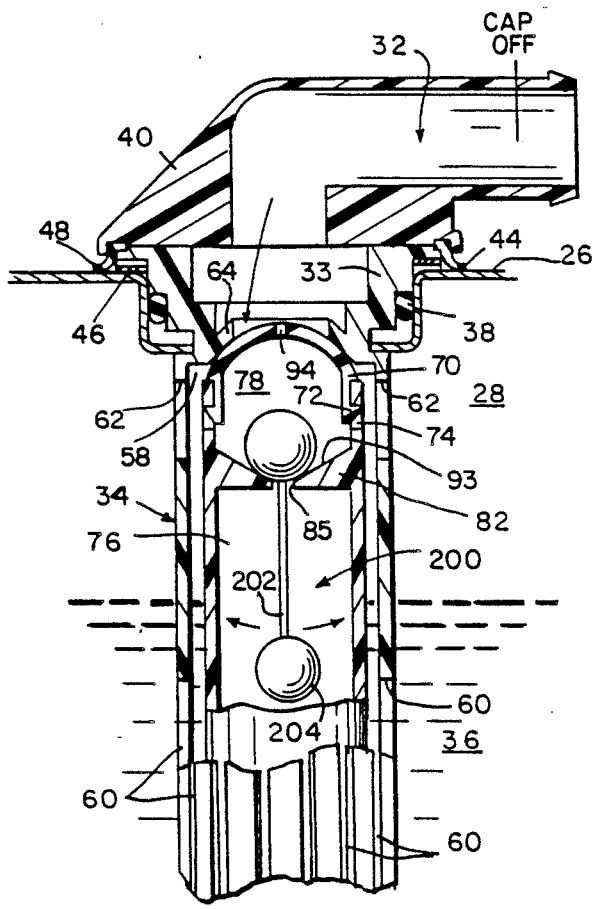
FIG. 7 is a transverse sectional detail view of another embodiment of the present invention showing a float valve in its outlet-closing position at high tank fuel levels and a pendulum-actuated ball valve covering a venting aperture formed in the float valve.

In another embodiment of the invention illustrated in FIG. 7, those elements referenced by numbers identical to those in FIGS. 1–5 perform the same or similar function. In this embodiment, a pendulum-actuated ball valve 92 is provided to control venting of lower chamber 76 through a central aperture 85 formed in valve seat 93. Although no snorkel tube is shown in connection with this embodiment, it will be appreciated that a tube such as tube 86 shown in Figs. 1–5 could be added to partition wall 82. In the illustrated embodiment, a pendulum 200 having a shaft 202 and a weight 204 is appended to ball valve 92. The shaft 202 of pendulum 200 depends from ball valve 92 and extends through central aperture 85 into lower chamber 76. As shown in FIG. 7, the inertia-actuated pendulum 20 is free to swing inside the lower chamber 76 formed in float valve 66 in response to vehicle operation.

In operation, float valve 66 floats to its outlet-closing position to provide an overfill-limiting fuel vapor barrier during refueling as described with reference to the embodiment illustrated in FIGS. 1–5. In the embodiment of FIG. 7, pendulum 200 swings in response to normal vehicle movement to assist in moving ball valve 92 on or relative to valve seat 93 and thereby away from seating engagement with central orifice 85. Such movement of ball valve 92 to a venting position (not shown but similar to a position shown in FIG. 4a) will release pressurized fuel vapor pent up in lower chamber 76 to the interior of the fuel tank 12 causing float valve 66 to lose buoyancy and sink, thereby moving dome-shaped upper cap 70 away from engagement with the valve seat 64 surrounding the venting outlet 42. Optionally, an auxiliary float (not shown) similar to the auxiliary float 96 shown in FIGS. 1–5 can be used, and will operate as previously described.

Figure 8:
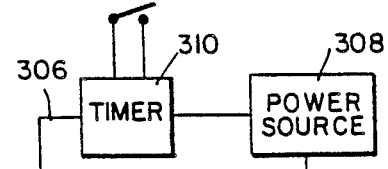
FIG. 8 is a transverse sectional detail view of yet another embodiment of the present invention showing a float valve in its outlet-closing position at high tank fuel levels and a magnet-actuated ball valve covering the venting aperture formed in the float valve.
Figure 8:
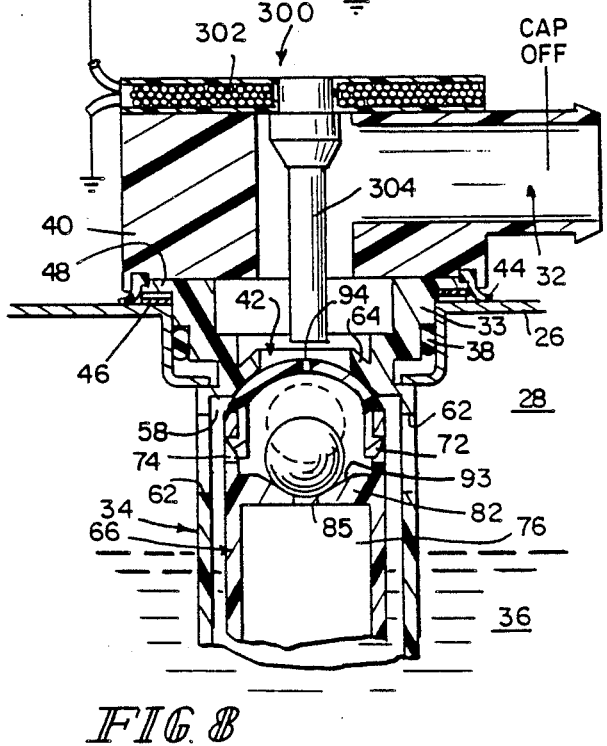

Another embodiment of the present invention is illustrated in FIG. 8. Those elements referenced by numbers identical to those in FIGS. 1-7 perform the same or similar function. In this embodiment, a magnet-actuated ball valve 92 is provided to control venting of lower chamber 76 through a central aperture 85 formed in valve seat 93.

In the embodiment illustrated in FIG. 8, the valve assembly includes an electromagnet 300 including a coil 302 and a magnetic core 304 depending downwardly into vapor discharge channel 32 and terminating in the proximity of venting outlet 42. Current is supplied to the electromagnet 300 by means of electrical wires 306 attached to draw voltage from a voltage source 308 which can be, for example, the fuel level indicator voltage supply (not shown) in the vehicle (not shown). A timer 310 is optionally provided to control provision of a voltage to the electromagnet 300. Ball valve 92 is formed of magnetic material and is in other respects similar to the ball valve described in other embodiments of the present invention. Optionally, an auxiliary float (not shown) and a snorkel tube (not shown) can be provided, operating as described with respect to previous embodiments.

In operation, float valve 66 floats as previously described to its outlet-closing position providing a vapor barrier in the tank 12 to limit overfilling. To move float valve 66 to an outlet-opening position, it is once again advantageous temporarily to move ball valve 92 away from central aperture 85 to allow fuel vapor to escape from lower chamber 76. In this embodiment, electromagnet 300 is energized to so move ball valve 92 from its seated position (shown in solid line) to an unseated position (shown in phantom line). Circuitry associated with electromagnet 300 receives a signal from, for example, a key-on indicator (not shown) of the vehicle. Electromagnet 300 is then energized to provide a magnetic force sufficient to lift ball valve 92 away from valve seat 93 defining central aperture 85 to a venting position represented by dotted lines in FIG. 8. Optionally, timer 310 is provided so that after a given time interval, for example, twenty seconds, the voltage supply to electromagnet 300 is cut off and ball valve 92 falls back to rest against valve seat 93. In other aspects, the apparatus operates in the same manner as do the previously described embodiments of the present invention.

Yet another embodiment of the present invention is illustrated in FIGS. 9-12. Those elements referenced by numbers identical to those in FIGS. 1-8 perform the same or similar function. In this embodiment, a diaphragm-actuated ball valve 92 is provided to control venting of lower chamber 76 through a central aperture 85 formed in valve seat 93. The diaphragm 410 connected to the ball valve 92 is exposed to a pressure differential in certain circumstances as explained below, which pressure differential acts to lift the diaphragm 410 and the ball valve 92 away from the valve seat 93 to uncover the central aperture 85 and vent pressurized fuel vapor from the lower chamber 76 to the interior of the fuel tank 12, thereby sinking the float valve 420.

Figure 9:
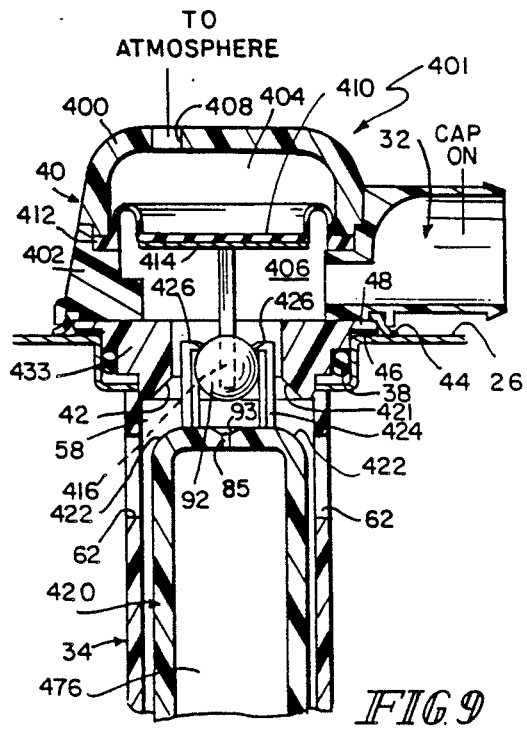
FIG. 9 is a traverse sectional detail view of still another embodiment of the present invention showing a diaphragm-actuated ball valve covering the venting aperture formed in the float valve.

The apparatus 401 is shown in its static condition in FIG. 9 at low tank fuel levels. The apparatus 401 includes a vent housing 40 and a valve housing 34 constructed and assembled substantially as in previous embodiments. Valve housing 34 includes a mounting portion 433.

Vent housing 40 illustratively includes a cap portion 400 and a mounting portion 402 which cooperate to form a hollow region interconnecting the venting outlet 42 and the vapor discharge channel 32 in fluid communication. An annular flexible diaphragm 410 is provided to partition the hollow region into an upper chamber 404 and a lower chamber 406 as shown in FIG. 9. Cap portion 400 is formed to include an aperture 408 so that upper chamber 404 is continuously exposed to atmosphere. Diaphragm 410 is made of a flexible material and is provided with an annular peripheral edge 412 sandwiched between a lower edge of cap portion 400 and an upper edge of mounting portion 402 to retain diaphragm 410 in place. An external spring (not shown) can be provided in upper chamber 404 to bias the diaphragm 410 into its normal rest position illustrated in FIG. 9. Alternatively, the diaphragm 410 may be formed of an elastomeric material selected normally retain the static position shown in FIG. 9 and to deform only under at least a predetermined pressure in excess of atmospheric pressure.

A top ball cage assembly 413 is mounted to the underside of diaphragm 410 to lie in the lower chamber 406 as shown in FIG. 9. The top ball cage assembly 413 includes a disc 414 and a plurality of legs 416 arranged to define a ball-receiving cage as shown, for example, in FIG. 12. Disc 414 is appended to the bottom of diaphragm 410 to provide a platform supporting three downwardly depending circumferentially spaced fingers 416. As shown best in FIG. 10, fingers 416 are provided at their distal ends with inwardly projecting flanges 418 to facilitate retention of ball valve 92 under normal conditions. Fingers 416 are formed of a flexible material such as spring steel or the like so as to disengage ball 92 when a sudden upward impulse force (as might result from a pressure differential between upper chamber 404 and lower chamber 406) is applied to disc 414.

A float valve 420 is received in valve chamber 58. A bottom ball cage assembly 415 is mounted on the top side of float valve 420 to extend upwardly through the venting outlet 42 into the lower portion of lower chamber 406 as shown best in FIG. 9. Float valve 420 also includes an annular shoulder 422 sized to seat against a valve seat 421 formed in the valve housing 34 in the region surrounding venting outlet 42.

Float valve 420 is formed to include an interior chamber 476 for retaining fuel vapor therein and a bottom opening (not shown) for direct communication with liquid fuel introduced into the valve chamber 58 formed in the valve housing 34. Float valve 420 is also formed to include a central aperture 85 configured and located to discharge fuel vapor from chamber 476 into valve chamber 58. A conical valve seat 493 is formed in the top end of float valve 420 to provide a seat against which a ball valve 92 is normally gravitationally urged to cover a central aperture 85 formed in the center of the valve seat 93.

Figure 12:
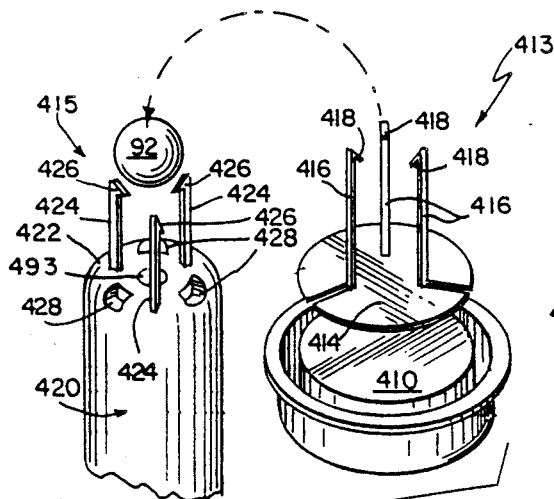
FIG. 12 is an exploded perspective view illustrating assembly of the float valve, ball valve, and differential pressure diaphragm shown in FIGS. 9-11.
Figure 11:
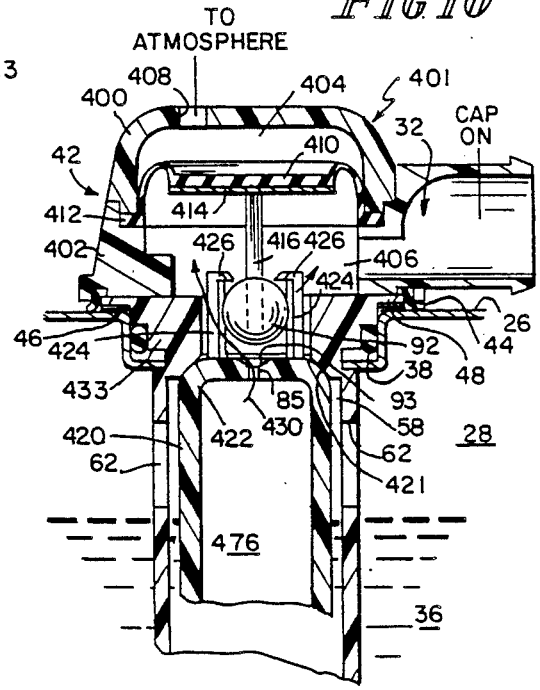
FIG. 11 is a view similar to FIGS. 9 and 10 showing upward movement of the diaphragm following exposure of the diaphragm to a pressure differential to lift the ball valve to a raised position venting pressurized fuel vapor from the interior region of the hollow float valve to reduce the buoyancy of the float valve.

As shown best in FIG. 12, float valve 420 also includes a plurality of upstanding fingers 424 having inwardly projecting flanges 426 at their distal ends. Fingers 424 are circumferentially spaced so as to receive ball valve 92 and are molded out of hard plastic so that fingers 424 will not flex enough relative to one another to disengage ball valve 92 or let the ball valve 92 leave the bottom ball cage assembly 415 defined by the three fingers 424. However, fingers 424 are of a length such that ball valve 92 is free to move axially away from central aperture 85 to a venting position as shown in FIG. 11 to allow venting of fuel vapor from chamber 476. Upstanding fingers 424 are spaced complementarily to downwardly depending fingers 416 such that both groups of fingers cooperate to form a cage for retaining ball 92. Float valve 420 is also provided with a series of recesses 428 spaced around shoulder 422 to receive the ends of downwardly depending fingers 416 so that ball valve 92 can be lowered to rest directly against valve seat 493 and cover central aperture 85 while still being retained by downwardly depending fingers 416.

An auxiliary float (not shown) can also be optionally provided inside chamber 476. The auxiliary float is of the structure described with reference to the previous embodiments. In addition, a snorkel tube (not shown) or a vapor reservoir (not shown) can be optionally provided on the underside of valve seat 493.

Figure 10:
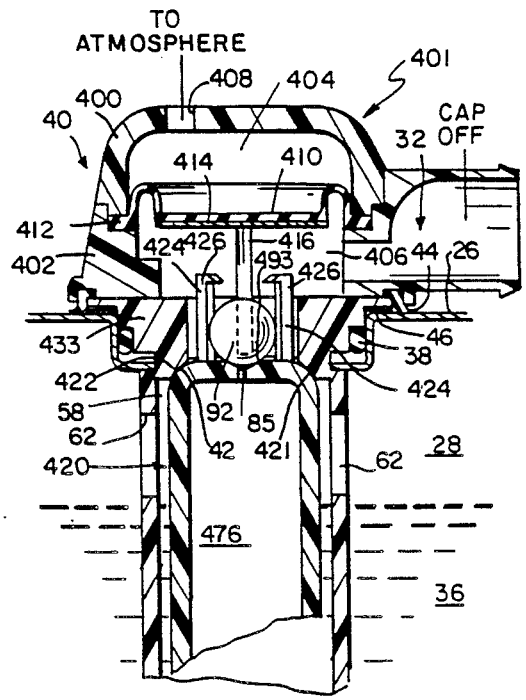
FIG. 10 is a view similar to FIG. 9 showing the float valve in its outlet-closing position at high tank fuel levels prior to lifting of the ball valve away from its seated position covering the venting aperture formed in the float valve.

Operation of the fuel vapor control valve assembly 401 during refueling is illustrated in FIG. 10. Fuel is added to fuel tank 12 and eventually reaches a level at which it can enter the inlet openings (not shown) formed in valve housing 34 and begin to fill valve chamber 58. Float valve 420 floats in the rising pool of liquid fuel to the outlet-closing position shown in FIG. 10 in which shoulders 422 of float valve 420 seat against the valve seat 421 to block flow of fuel vapor through venting outlet 42. Because the fuel cap is off and the filler neck is open to the atmosphere, the pressure in vapor discharge channel 32, and therefore in lower chamber 406, is atmospheric. The vapor discharge channel 32 is connected to the filler neck as shown in FIG. 1. The pressure in upper chamber 404 is always atmospheric because aperture 408 is open to the atmosphere. Therefore, the top side and the underside of flexible diaphragm 410 are each exposed to atmospheric pressure and the diaphragm 410 remains in equilibrium in its normal rest position shown in FIGS. 9 and 10. However, as shown in FIG. 10, the float valve 420 has moved upwardly to engage valve seat 421 causing the ball valve 92 retained loosely in the ball cage 413, 145 to seat in the axially upwardly facing valve seat 493 and close central aperture 85 formed in the float valve 420.

A vapor pressure barrier is thereby provided by movement of the float valve 420 to close venting outlet 42 to prevent tank overfill as has been previously described. A quantity of fuel vapor is retained in chamber 476 to enhance the buoyancy of the float valve 420 because ball valve 92 is seated on valve seat 493 to close the central aperture 85.

Movement of the diaphragm 410 to lift ball valve 92 off its seat on valve seat 493 is illustrated in FIG. 12. It is not necessary for the vehicle to move or otherwise operate to cause the diaphragm 410 to lift ball valve 92 off seat 493 because diaphragm 410 is pressure-actuated. With the fuel cap 22 mounted on filler neck 14, vapor discharge channel 32, and hence lower chamber 406, are exposed to increasing fuel vapor pressure, while upper chamber 404 is exposed to atmospheric pressure. When the fuel vapor pressure in lower chamber 406 exceeds atmospheric pressure, diaphragm 410 is biased upwardly toward upper chamber 404. The upward movement of diaphragm 410 causes upward movement of fingers 416, which engage ball valve 92 and move it out of seated engagement with valve seat 493 and into a venting position uncovering central aperture 85. Fuel vapor trapped in chamber 476 can then vent through central aperture into lower chamber 406 as shown by arrow 430 in FIG. 12.

As fuel vapor vents from chamber 476, float valve 420 begins to sink. This sinking motion brings flanges 426 of upstanding fingers 424 into engagement with the upper surface of ball valve 92 at the same time flanges 418 of downwardly depending fingers 416 are in engagement with the lower surface of ball valve 92. If both sets of fingers 416, 424 were formed of inflexible material, it is at least possible that the fingers 416, 424 would lock against ball valve 92, and further movement of the fingers 416, 424 relative to each other would be prevented. However, since downwardly depending fingers 416 are formed of flexible material, fingers 416 will release ball valve 92 in response to exposure to a predetermined force. Thus, as diaphragm 410 continues to be biased upwardly, and as float valve 420 begins to sink downwardly, the forces on fingers 416 reach the predetermined magnitude at which fingers 416 disengage ball 92. At this point, float valve 420 can sink downwardly from the position shown in FIG. 11 to an outlet-opening position as shown, for example, in FIG. 9 in which fuel vapor from vapor space 28 can vent through openings 62 and through venting outlet 42. Ball valve 92 is retained in the proximity of central aperture by upstanding fingers 424, such that when float valve 420 returns to the outlet-closing position during subsequent refueling (as illustrated in FIG. 10), ball valve 92 drops back into seated engagement with valve seat 493 and downwardly depending fingers 416 flex to move back into engagement with ball valve 92.

In another embodiment of the invention illustrated in FIGS. 13 and 14, those elements referenced by numbers identical to those in FIGS. 1-12 perform the same or similar function. In this embodiment, another type of diaphragm-actuated mechanism 500 is provided to lift ball valve 92 off of valve seat 93 formed in float valve 520 to control venting of lower chamber 576 formed in float valve 520 through central aperture 85 defined by valve seat 93.

Float valve 520 is similar to the float valves described in connection with the preceding embodiments in that it includes a partition wall 582 dividing the interior into a lower chamber 576 and an upper chamber 578. A dome-shaped upper cap 570 is connected at the top of float valve 520 to provide closure means for seating against the valve seat 521 formed at the end of the valve housing 56. However, an additional linkage-receiving aperture 504 is formed in a central region of dome-shaped cap 570 to receive a linkage 510 therethrough as shown in FIGS. 13 and 14. Nevertheless, cap 570 operates to block flow of fuel vapor from vapor space 28 in fuel tank 12 into vapor discharge conduit because upper chamber 578 is now closed to vapor space 28 when the float valve 520 is moved to its venting outlet-closing position as shown in FIGS. 13 and 14.

A mechanism 506 is provided for lifting ball valve 92 off of valve seat 93 in response to upward movement of diaphragm 410 under a pressure differential as explained in connection with the embodiment of FIGS. 9-12. Mechanism 506 includes a support platform 508 fixed to mounting portion 402 to lie in the space between the diaphragm 410 and the top of valve housing 34, a rotatable linkage 510, a ball-lifting member 512, and a linkage-lifting member 514 attached to the underside of diaphragm 410. Essentially, the rotatable linkage 510 is mounted at its upper end to the support platform 508 for rotation relative to the support platform 508 about a longitudinal axis of the linkage 510. The linkage-lifting member 514 includes a stem 516 that extends downwardly into a central lumen formed in the rotatable linkage 510 and includes a T-bar that engages in a helical slot formed in rotatable linkage 510 as shown in FIG. 13. It will be understood that upward movement of the linkage-lifting member 514 in response to upward movement of diaphragm 410 will cause the rotatable linkage 510 to rotate about its longitudinal axis relative to the fixed support platform 508.

The ball-lifting member 512 includes an upper T-bar stem 516 connected to the rotatable linkage 510 to rotate therewith and a ball cage 518 appended to a lower end of the upper T-bar stem 516 to surround ball valve 92 as shown in FIG. 13. Ball cage 518 includes radially inwardly extending fingers for engaging and lifting ball valve 92 off of the valve seat 93 in response to upward movement of ball cage 518.

A pair of upwardly inclined spiral ramps 522 are appended to the top side of partition wall. These ramps 522 provide cam means for engaging the lower edge of ball cage 518 and moving the ball cage 518 in an axially upward direction as shown in FIG. 14 in response to rotation of ball cage 518 by the rotatable linkage 410.

In operation, upward movement of diaphragm 410 exposed to a pressure differential in chambers 503 and 505 lifts linkage-lifting member 514, rotates rotatable linkage 510 and ball-lifting member 512 about their longitudinal axes, and lifts ball valve 92 away from valve seat 93. In other respects, this mechanism operates in a fashion similar to the embodiment of FIGS. 9-12.

A preferred embodiment of the present invention is illustrated in FIG. 15. Essentially, this embodiment shows a preferred shape of float valve 66, valve housing 34, and vent housing 40. A bayonet-type mounting is provided on the apparatus for connecting the apparatus to the top wall 26 of fuel tank 12.

Although the invention has been described in detail with reference to certain preferred embodiments, variations and modifications exist within the scope and spirit of the invention as described and defined in the following claims.

What is claimed is:

1. An apparatus for controlling discharge of fuel vapor from a fuel tank of a vehicle, the apparatus comprising
a valve housing mounted in the fuel tank, the valve housing being formed to include outlet means for discharging fuel vapor from the tank to a point of use outside the tank and inlet means for receiving liquid fuel from the tank, and
means disposed in the valve housing for controlling venting of fuel vapor through the outlet means, the controlling means including first valve means for seating in the outlet means to block flow of fuel vapor therethrough, the first valve means being movable between an outlet means—blocking position and an outlet means—unblocking position, float means for floating in liquid fuel introduced into the valve housing through the inlet means when the liquid fuel level in the valve housing rises above a predetermined level, the float means being formed to include chamber means for holding a volume of pressurized fuel vapor therein and aperture means for venting at least a portion of the volume of pressurized vapor from the chamber means, the first valve means being appended to the float means for movement therewith, and second valve means for controlling discharge of fuel vapor through the aperture means in response to normal movement of the vehicle, the second valve means having a predetermined weight sufficient to cause the second valve means to be normally gravitationally urged to a position blocking flow of fuel vapor out of the chamber means through the aperture means so that pressurized fuel vapor is retained n the chamber means to buoyantly support the float means in liquid fuel received in the valve housing, the predetermined weight being selected so that the second valve means moves relative to the float means to allow discharge of fuel vapor through the aperture means to reduce the buoyancy of the float means in response to normal movement of the vehicle, thereby sinking the float means in the valve housing so that the first valve means is moved to its outlet means—unblocking position to allow venting of fuel vapor from the fuel tank through the outlet means.

2. An apparatus for controlling discharge of fuel vapor from a vapor space of a vehicle fuel tank, the apparatus comprising
housing means mounted in the fuel tank for conducting fuel vapor from the fuel tank to a point outside the fuel tank, the housing means being formed to include first inlet means for receiving liquid fuel from the fuel tank, second inlet means for receiving fuel vapor from the vapor space of the fuel tank, and an outlet for discharging fuel vapor, and
means disposed within the housing means for controlling flow of fuel vapor through the outlet, the controlling means including first float means for floating between an outlet-closing position and an outlet-opening position in liquid fuel introduced into the housing means through the first inlet means, the first float means being configured to float to the outlet-closing position when liquid fuel rises to a predetermined level in the housing means, the first float means being formed to include first chamber means for holding a volume of fuel vapor therein and aperture means for venting at least a portion of the volume of fuel vapor from the first chamber means, and blocking means for normally blocking flow of fuel vapor from the first chamber means through the aperture means, the blocking means being positioned so as to be normally gravitationally urged into a blocking position preventing flow through the aperture means, thereby retaining fuel vapor in the first chamber means to aid in floating the first float means to the outlet-closing position so that a pressurized vapor barrier is provided in the vapor space of the fuel tank to assist in preventing overfilling of the tank during refueling, the blocking means having a predetermined mass selected so that the blocking means will move away from the aperture means to an unblocking position in response to normal movement of the vehicle to vent fuel vapor from the first chamber means so that the first float means will move to the outlet-opening position whereby fuel vapor can vent from the fuel tank through the outlet.

3. The apparatus of claim 2, further comprising second float means disposed in the first chamber means for floating in the presence of at least a predetermined amount of liquid fuel introduced to the first chamber means to provide buoyancy to assist in moving the first float means to the outlet-closing position, the second float means being coupled to the first float means for movement therewith and formed to include second chamber means for retaining fuel vapor therein.

4. An apparatus for controlling discharge of fuel vapor from a vapor space of a vehicle fuel tank, the apparatus comprising
   a valve housing mounted to the fuel tank and extending axially therein, the valve housing being formed to include a valve chamber, a plurality of lower inlet apertures through which liquid fuel from the tank enters the valve chamber, a plurality of upper inlet apertures through which vapor from the vapor space enters the valve chamber, and a first valve seat defining an outlet aperture for discharging fuel vapor from the valve chamber to a point outside the fuel tank,
   a hollow float valve positioned within the valve chamber for axial movement between an outlet-closing position in which the float valve floats on liquid fuel introduced into the valve chamber to seat against the first value seat and an outlet-opening position in which the float valve sinks away from seating engagement with the first valve seat, the float valve being formed to include a first chamber having a volume of fuel vapor trapped therein, a second chamber, a transversely extending wall separating the first chamber from the second chamber, the wall being formed to include a second valve seat defining an orifice for venting fuel vapor from the first chamber to the second chamber, the float valve further being formed to include a vapor transmission opening for allowing fuel vapor flow between the second chamber and the valve chamber, and
   a ball sized and weighted to seat against the second valve seat in the second chamber to close the orifice, thereby preventing fuel vapor from escaping from the first chamber so that the float valve is buoyantly supported in liquid fuel received in the valve chamber to float to the outlet-closing position, the ball having a mass selected so that the ball will temporarily move away from seated engagement on the second valve seat in response to normal movement of the vehicle, thereby temporarily uncovering the orifice and allowing fuel vapor to escape from the first chamber through the orifice so that the float valve sinks to the outlet-opening position allowing flow of fuel vapor to vent from the fuel tank through the outlet aperture.

5. The apparatus of claim 4, further comprising an auxiliary float chamber positioned within the first chamber and attached to the hollow float valve to assist in moving the float valve to its outlet-closing position, the auxiliary float chamber being formed to retain fuel vapor therein.

6. The apparatus of claim 2, wherein the first chamber means includes a wall formed to include the aperture means therein, and a snorkel tube depends from the wall and includes vent passageway means for conducting fuel vapor in the first chamber means to the aperture means.

7. The apparatus of claim 6, wherein the wall is formed to include an annular pocket having an opening communicating with the first chamber means and an inner wall defined by the snorkel tube.

8. The apparatus of claim 7, wherein the annular pocket is located to permit fuel vapor from the first chamber means to collect in the pocket to assist in re-floating the first float means from the outlet-opening position to the outlet-closing position.

9. The apparatus of claim 2, wherein the blocking means includes a pendulum extending through the aperture means to swing in the first chamber means.

10. An apparatus for controlling flow of fluid through a venting aperture in a fuel tank, the apparatus comprising
    a housing,
    a float valve disposed in an unattached to the housing, and formed to include a float chamber therein, the float valve being moveable in the housing between a closed position blocking flow of fluid through the venting aperture and an open position allowing flow of fluid through the venting aperture, and
    means for venting the float chamber to reduce the buoyancy of the float valve so that the float valve moves away from the closed position toward the open position.

11. The apparatus of claim 10, further comprising auxiliary float means for providing buoyancy to assist in moving the float valve from the open position to the closed position.

12. The apparatus of claim 11, wherein the auxiliary float means is appended to the float valve and formed to include an auxiliary float chamber for retaining fluid therein.

13. The apparatus of claim 11, wherein the auxiliary float means is positioned within the float chamber.

14. The apparatus of claim 11, further comprising rollover means for assisting in moving the float valve to the closed position when the fuel tank tilts beyond a predetermined angle.

15. The apparatus of claim 14, wherein the rollover means includes spring means for yieldably biasing the auxiliary float means in a direction toward the venting aperture.

16. The apparatus of claim 14 wherein the rollover means is positioned to extend into the auxiliary float chamber.

17. The apparatus of claim 11, wherein the auxiliary float means includes an invented cup having an opening directed away from the venting aperture.

18. The apparatus of claim 10, wherein the float valve further includes means for blocking flow of fluid through the venting aperture upon movement of the float valve to its closed position.

19. The apparatus of claim 18, wherein the blocking means is formed to include a hollow chamber for receiving fluid from the float chamber and the venting means is positioned within the hollow chamber.

20. The apparatus of claim 10, wherein the venting means includes outlet means formed in the float valve for venting fluid from the float chamber and valve means for controlling flow of fluid through the outlet means to control the buoyancy of the float valve.

21. The apparatus of claim 20, wherein the valve means has a mass selected so that the valve means is gravitationally urged into a position blocking flow of fluid through the outlet means at least when the fuel tank is stationary and moves to a position allowing fluid flow through the outlet means in response to sufficient movement of the fuel tank.

22. The apparatus of claim 10, wherein the float valve is formed to include second chamber means for retaining fluid therein and the venting means includes outlet means formed in the float valve for communicating fluid between the float chamber and the second chamber means and valve means for controlling flow of fluid through the outlet means to control the buoyancy of the float valve.

23. The apparatus of claim 22, wherein the valve means has a mass selected to effect a first closing pressure on the outlet means at least when the apparatus is stationary and a size selected relative to the second chamber means to permit the valve means to move therein and thereby effect a second closing pressure on the outlet means that is less than the first closing pressure when the apparatus is subjected to sufficient movement.

24. The apparatus of claim 10, wherein the venting means includes outlet means formed in the float valve for venting fluid from the first chamber means, and the apparatus further comprises a snorkel tube extending into the first chamber means, the snorkel tube being formed to include an inlet opening communicating with fluid in the first chamber means, an outlet opening corresponding with the outlet means, and a fluid-conducting passageway interconnecting the inlet and outlet means.

25. The apparatus of claim 24, further comprising a pocket formed in the float means having an opening directed toward the first chamber means and forming an annular cavity about the snorkel tube, the pocket being positioned to receive fluid from the first chamber means and retain fluid therein to assist in maintaining the buoyancy of the float valve.

26. An apparatus for controlling discharge of fuel vapor from a vapor space of a vehicle fuel tank, the apparatus comprising
means for conducting fuel vapor from the fuel tank to a point outside the fuel tank,
float means for closing the conducting means during refueling to prevent discharge of fuel vapor therethrough, the float means being supported for movement in the conducting means between a closed position blocking flow of fuel vapor through the conducting means and an open position allowing flow of fuel vapor through the conducting means, and
means for assisting in positively moving the float means away from its closed position toward the open position in response to vehicle movement after refueling has been completed.

27. The apparatus of claim 26, wherein the conducting means is formed to include a plurality of elongated liquid fuel inlet apertures positioned to receive liquid fuel from the fuel tank and a plurality of fuel vapor inlet apertures positioned in spaced-apart relationship with the plurality of liquid fuel inlet apertures to receive fuel vapor from the fuel tank.

28. The apparatus of claim 26, wherein the float means includes means for blocking flow of fuel vapor through the conducting means and means for moving the blocking means between the closed position and the open position.

29. The apparatus of claim 28, wherein the moving means is formed to include first chamber means for holding a volume of fuel vapor therein to increase the buoyancy of the float means and aperture means for venting at least a portion of the volume of fuel vapor from the first chamber means to decrease the buoyancy of the float means.

30. The apparatus of claim 29, wherein the assisting means includes second blocking means for selectively blocking flow of fuel vapor through the aperture means.

31. The apparatus of claim 30, wherein the second blocking means has a mass selected so that the second blocking means is normally gravitationally urged into a position blocking flow of fuel vapor through the aperture means.

32. The apparatus of claim 30, wherein the blocking means is formed to include second chamber means for receiving fuel vapor from the first chamber means, the second blocking means is positioned in the second chamber means, and the second blocking means has a size selected relative to the second chamber means to permit the second blocking means to move therein away from the position blocking flow of fuel vapor through the aperture means in response to movement of the vehicle.

33. The apparatus of claim 29, wherein the moving means includes a top wall formed to include the aperture means, and the apparatus further comprises a snorkel tube depending from the top wall in communication with the aperture means to allow transmission of fuel vapor between the first chamber means and the aperture means.

34. The apparatus of claim 33, wherein the top wall is formed to include an annular pocket having an opening communicating with the first chamber means and having an inner wall defined by the snorkel tube, and the pocket is positioned to retain fuel vapor therein to assist in refloating the float means from an open position to the closed position.

35. The apparatus of claim 33, wherein the top wall includes a valve seat bordering the aperture means and the second blocking means is sized to seat against the valve seat normally to block flow of fuel vapor through the aperture means.

36. The apparatus of claim 28, further comprising second float means for providing buoyancy to assist the moving means in moving the blocking means from an open position to the closed position, the second float means being appended to the moving means.

37. The apparatus of claim 36, wherein the second float means includes an inverted cup having an opening directed toward the fuel tank.

38. The apparatus of claim 37, further comprising spring means for yieldably biasing the second float means away from the fuel tank toward a position providing buoyancy to the first float means.

39. The apparatus of claim 36, wherein the float means includes an inverted cup having an opening directed towards the fuel tank and defining an interior region and the second float means is positioned within the interior region.

40. The apparatus of claim 39, further comprising spring means for yieldably biasing the second float means toward a position providing buoyancy to the first float means.

41. The apparatus of claim 36, further comprising rollover means for moving the blocking means toward the closed position in response to tilting of the fuel tank beyond a predetermined angle.

42. An apparatus for controlling discharge of fuel vapor from a vehicle fuel tank, the apparatus comprising
a valve housing mounted in the fuel tank, the valve housing being formed to include at least one vapor outlet opening,
a float valve disposed in the housing and movable between an open position allowing flow of fuel vapor through the outlet opening and a closed position preventing flow of fuel vapor through the outlet opening, the float valve being formed to include a first chamber, and a valve member disposed on the float valve and movable relative to the float valve selectively to vent the first chamber to reduce the buoyancy of the float valve so that the float valve moves away from the closed position toward the open position.

43. The apparatus of claim 42, wherein the valve member is normally positioned on the float valve.

44. The apparatus of claim 42, wherein the valve housing is formed to include a plurality of liquid fuel inlet apertures.

45. The apparatus of claim 42, wherein the valve housing is formed to include a valve seat sized to receive the float valve in vapor-sealing engagement therewith.

46. The apparatus of claim 42, wherein the float valve includes a cylinder formed to include the first chamber and a cap formed to include a venting orifice connecting the first chamber and the second chamber in fluid communication.

47. The apparatus of claim 46, wherein the cap is provided with a plurality of vapor transmission apertures communicating vapor between the second chamber and the valve housing.

48. The apparatus of claim 46, wherein the valve member is positioned in the second chamber.

49. The apparatus of claim 46, wherein the cylinder includes a top wall, and the cap includes an annular wall projecting axially from the top wall, the annular wall being formed to include a circumferentially-extending opening, and a dome portion provided with lugs sized to fit the circumferentially-extending opening.

50. The apparatus of claim 49, wherein the dome is formed to include a bleed aperture.

51. The apparatus of claim 49, wherein the top wall is formed to include the venting orifice.

52. The apparatus of claim 49, further comprising a snorkel appended toe the top wall and extending into the first chamber, the snorkel having being formed to include an outlet opening corresponding to the venting orifice.

53. The apparatus of claim 52, wherein the top wall is formed to include an annular groove having an inner wall corresponding to the snorkel tube, and an opening directed toward the first chamber so that fuel vapor from the first chamber can enter the groove and assist in providing buoyancy to the float valve.

54. The apparatus of claim 49, wherein the top wall is formed to include a ramp bordering the venting orifice and sized to retain the valve member normally thereon.

55. The apparatus of claim 54, wherein the valve member includes a ball cooperable with the ramp to normally occupy a position blocking flow of fuel vapor through the venting orifice, and the ball is movable on the ramp portion away from the venting orifice in response to movement of the apparatus to allow flow of fuel vapor through the venting orifice.

56. An apparatus for controlling discharge of fuel vapor from a vehicle fuel tank, the apparatus comprising a valve housing mounted in the fuel tank, the valve housing being formed to include at least one vapor outlet opening, a float valve disposed in the housing and movable between an open position allowing flow of fuel vapor through the outlet opening and the closed position preventing flow of fuel vapor through the outlet opening, the float valve being formed to include a first chamber, a valve member movable relative to the float valve to selectively vent the first chamber to reduce the buoyancy of the float valve so that the float valve moves away from the closed position toward the open position, and an auxiliary float member appended to the float valve, the auxiliary float member being formed to include an auxiliary float chamber.

57. The apparatus of claim 56, wherein the auxiliary float member is positioned within the first chamber.

58. The apparatus of claim 56, wherein the auxiliary float member includes an inverted cup having an opening directed toward the fuel tank.

59. The apparatus of claim 56, further comprising a spring received in the auxiliary chamber to assist in moving the float valve to the closed position in response to tilting of the fuel tank beyond a predetermined angle.

60. The apparatus of claim 59, wherein the valve housing includes a bottom closure member having an upstanding annular rim defining a circular area and the spring is positioned to act between the circular area and the auxiliary float member.

61. The apparatus of claim 60, wherein the auxiliary float member includes a radially inwardly extending lip and the spring acts between the circular area and the lip.

62. An apparatus for controlling flow of fluid through an aperture, the apparatus comprising a housing, a float valve disposed in and unattached to the housing and formed to include a float chamber, the float valve being moveable in the housing between an aperture blocking position and an aperture-unblocking position, and means for controlling movement of the float valve by selectively venting fluid from the float chamber to reduce the buoyancy of the float valve.

* * * * *